US012588663B1

(12) United States Patent
Youngk

(10) Patent No.: US 12,588,663 B1
(45) Date of Patent: Mar. 31, 2026

(54) ROBOTIC OYSTER AQUACULTURE SYSTEM, TECHNIQUE, AND INTELLIGENT CAGE HOISTER

(71) Applicant: Richard David Youngk, Annapolis, MD (US)

(72) Inventor: Richard David Youngk, Annapolis, MD (US)

(73) Assignee: Richard David Youngk, Annapolis, MD (US)

( * ) Notice: Subject to any disclaimer, the term of this patent is extended or adjusted under 35 U.S.C. 154(b) by 0 days.

(21) Appl. No.: 18/951,836

(22) Filed: Nov. 19, 2024

(51) Int. Cl.
| | |
|---|---|
| *A01K 61/50* | (2017.01) |
| *A01K 61/60* | (2017.01) |
| *B66D 1/50* | (2006.01) |

(52) U.S. Cl.
CPC .............. *A01K 61/50* (2017.01); *A01K 61/60* (2017.01); *B66D 1/505* (2013.01); *B66D 2700/0141* (2013.01)

(58) Field of Classification Search
USPC ........ 119/200–203, 207–209, 221, 223, 234, 119/238–241, 235
See application file for complete search history.

(56) References Cited

U.S. PATENT DOCUMENTS

| | | | | |
|---|---|---|---|---|
| 1,839,201 A | * | 1/1932 | Cleveland | E01B 35/02 |
| | | | | 33/651.1 |
| 3,573,934 A | * | 4/1971 | Mitchell | A01K 79/00 |
| | | | | 43/6.5 |
| 4,285,298 A | * | 8/1981 | Dugan | A01K 61/59 |
| | | | | 119/207 |
| 5,628,280 A | * | 5/1997 | Ericsson | A01K 61/60 |
| | | | | 119/239 |
| 9,655,347 B2 | * | 5/2017 | Troy | A01K 61/65 |
| 11,766,030 B2 | * | 9/2023 | Ayers | A01K 61/80 |
| | | | | 119/217 |
| 2021/0244005 A1 | * | 8/2021 | Sinclair | A01G 33/00 |

FOREIGN PATENT DOCUMENTS

| | | | | |
|---|---|---|---|---|
| JP | 2008101045 | * | 5/2008 | C09D 153/00 |
| KR | 20180091037 | * | 8/2018 | A01K 61/54 |
| WO | WO-2021030237 A2 | * | 2/2021 | A01K 61/60 |

* cited by examiner

*Primary Examiner* — Andrea M Valenti

(57) ABSTRACT

The oyster and shellfish aquaculture system includes an arrangement of equipment and controls to provide for growth and harvest of oysters. The shellfish will be contained in cages which are supported by lift structure and equipment. This system will primarily benefit small aquaculture farms or private waterfront property owners. Automated equipment will be used to lift the shellfish from the water. Sensors, controls and communication are configured to provide effective and efficient aquaculture farming while keeping records to facilitate best management of the aquaculture operations.

8 Claims, 7 Drawing Sheets

ROBOTIC OYSTER AQUACULTURE SYSTEM, TECHNIQUE, AND INTELLIGENT CAGE HOISTER

BACKGROUND OF THE INVENTION

Oyster harvest in the Chesapeake Bay declined significantly since 1900 and by 2000. Oyster harvest in Virginia, at its lowest, was only about 1% of previous totals. Recent efforts have been taken to restore natural oyster reef growth in Chesapeake Bay and with significant increases in the health of and size of these reefs. With equal importance and increase, intensive (caged) oyster aquaculture has also contributed to Chesapeake Bay oysters' growth and harvest.

Intensive oyster aquaculture typically includes significant labor efforts with the productivity and profitability of smaller farms most greatly affected. Control of biofouling is a major cause of the labor effort and is due to the need for frequent cleaning or use of desiccation for biofouling control. While larger aquaculture farms can be financially successful, smaller farms can have difficulty with efficiency. Support of one or two employees with the expertise needed to comply with state harvest and health department regulation can be a hurdle. Automation of the maintenance and harvest operations can potentially provide a great asset for the small commercial farm or the private oyster gardener.

An additional hurdle for shellfish aquaculture is the ability to operate in near-shore areas. These difficulties include shallow water, mud bottom and heavy seas. In addition, the approval of waterfront property owners can make state permitting difficult, delayed, expensive and/or impossible.

This invention embodies the system, techniques and equipment intended to harvest oysters and other shellfish with low effort and successful production rates. Utilizing robotic equipment with intelligent control, monitoring, record keeping, and reporting is paramount to this effort. Additionally private pier-side use may preclude most permitting requirements.

SUMMARY OF THE INVENTION

The description of the oyster and shellfish aquaculture farming system is provided in this summary. The oyster and shellfish aquaculture system includes an arrangement of equipment and controls to provide for growth and harvest of oysters. The shellfish will be contained in configuration of cages and mesh grow-out bags which are supported by hoist support structure and equipment.

In order to reduce labor efforts, the embodiment of this idea will use electric (and sometimes manual) powered lift equipment. Sensors, controls and communication are configured to provide effective and efficient aquaculture farming while keeping records to facilitate best management of the aquaculture operations.

A cage hoist structural joist is configured to attach equipment necessary to periodically lift the oysters from the water for the control of marine biological fouling. The support structure framework will be arranged to support a maximum number of cage hoists. Each cage hoist will be fitted with a maximum number of cages, a power system, winches, a control system and communication equipment. The foundation support for the hoist support structure includes a variety of techniques including subsurface pilings, surface structure or buoyant floating structure as appropriate to suit local river conditions.

The solar power system embodied in this disclosure includes a photovoltaic panel, battery storage, and a charge controller. This equipment is supported by the hoist support framework and, when necessary, provides the power necessary to operate the lift winches and the control equipment. Alternately and based on availability, the lift power is provided by the electric utility service or manual operation.

The cage hoist and winches provide a means to support and raise the cages as needed for periodic maintenance and for harvest. A winch is located on the cage hoist at a high point on the framework and are arranged to provide optimum exposure to the water column supportive of shellfish growth.

The communication and control systems are powered by a battery electrical system and programmed to measure cage position, weather information, shellfish growth rates, and biofouling in order to timely and properly position the aquaculture cages. The control system also provides local operation and input for cage harvest. Maintenance records are maintained to support effective farm management.

BRIEF DESCRIPTION OF DRAWINGS

Features of the system are provided in the following description of the drawings. Note that the left most character in the drawing reference number identifies the figure number where first identified.

FIG. 6B identifies a configuration of footing supports for placement on the river bottom. FIG. 6C demonstrates the use of floating pontoons to support the lift framework. River location will dictate selection of the appropriate support structure.

DETAILED DESCRIPTION OF THE DRAWINGS

Embodiment of this invention provides for an oyster and shellfish aquaculture farming system which incorporates an intelligent robotic hoist system to lift and tumble oyster cages so as to promote healthy shellfish growth while preventing accumulation of marine biofouling. The shellfish are contained in cages with mesh bags, supported in the water column, and are periodically lifted for desiccation to control the unwanted marine biofouling organisms. Brine spray can also be used in conjunction with desiccation to control the biofouling. Multiple cage hoists are arranged for support on the lift framework to accommodate local environment, river bottom, and shellfish growth conditions. Periodic shellfish desiccation will be initiated by communication and control systems. Harvest will be accomplished by lifting the cages for access using the local control. A spray system is also used to coat the shellfish at the beginning of the desiccation period to enhance biofouling control.

Figure 1A:
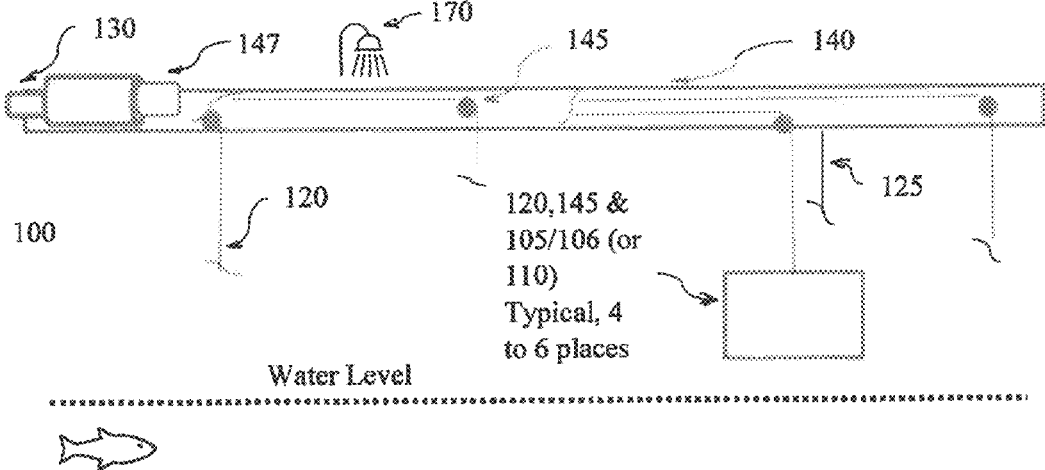
FIG. 1A and FIG. 1B illustrate arrangements of the cage hoist unit which provides a means to lift multiple shellfish cages using a winch and cable supported by a joist structural member. The raised position for desiccation is illustrated in FIG. 1A. The lowered and submerged position, for growing, is illustrated in FIG. 1B.
Figure 1B:
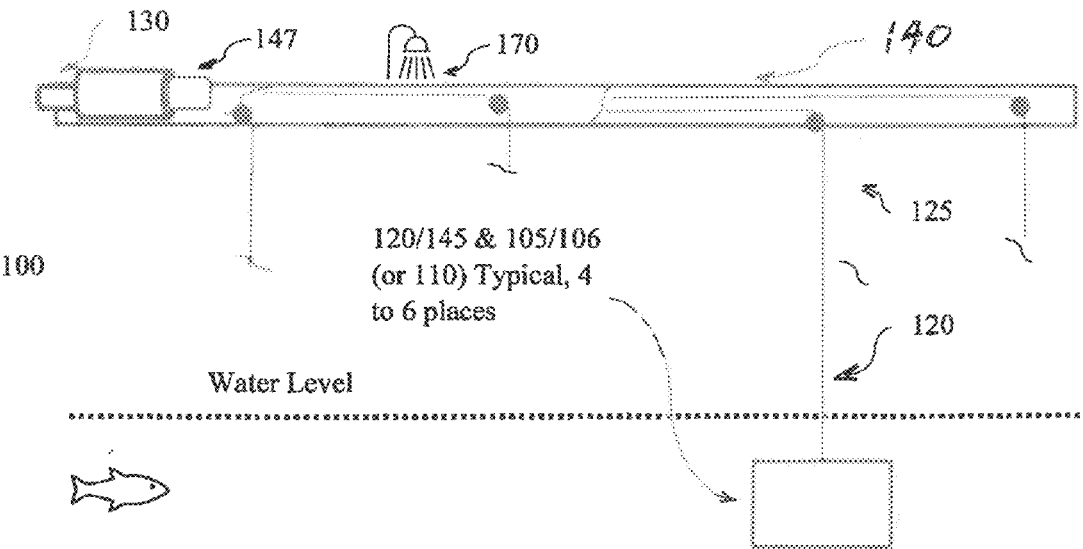

FIG. 1A elevation view illustrates the cage hoist 100 in the raised position (for desiccation or harvest) with the arrangement provided in accordance with an embodiment of the present invention. The cages 105 with grow out bags 106 are suspended by cable 120 and positioned using the winch 130. The grow out bags 106, which contain the shellfish, are positioned within the cage 105. The joist 140 provides support for each pulley 145, alignment/load sensor 147 and the winch 130. The tumbling cage 110 is an alternate cage design to facilitate shellfish tumbling in addition to desiccation. FIG. 1B provides the illustration of the cages in the lower position for growing the shellfish. For both FIG. 1A and FIG. 1B, the suspension cable 125 is attached to the cage 105 (or 110) and the cable 120 is then used to tumble the cages and enclosed shellfish. The desiccation cycle pre-wash spray system 170 will be attached to the joist as needed to spray each cage.

Figure 2:
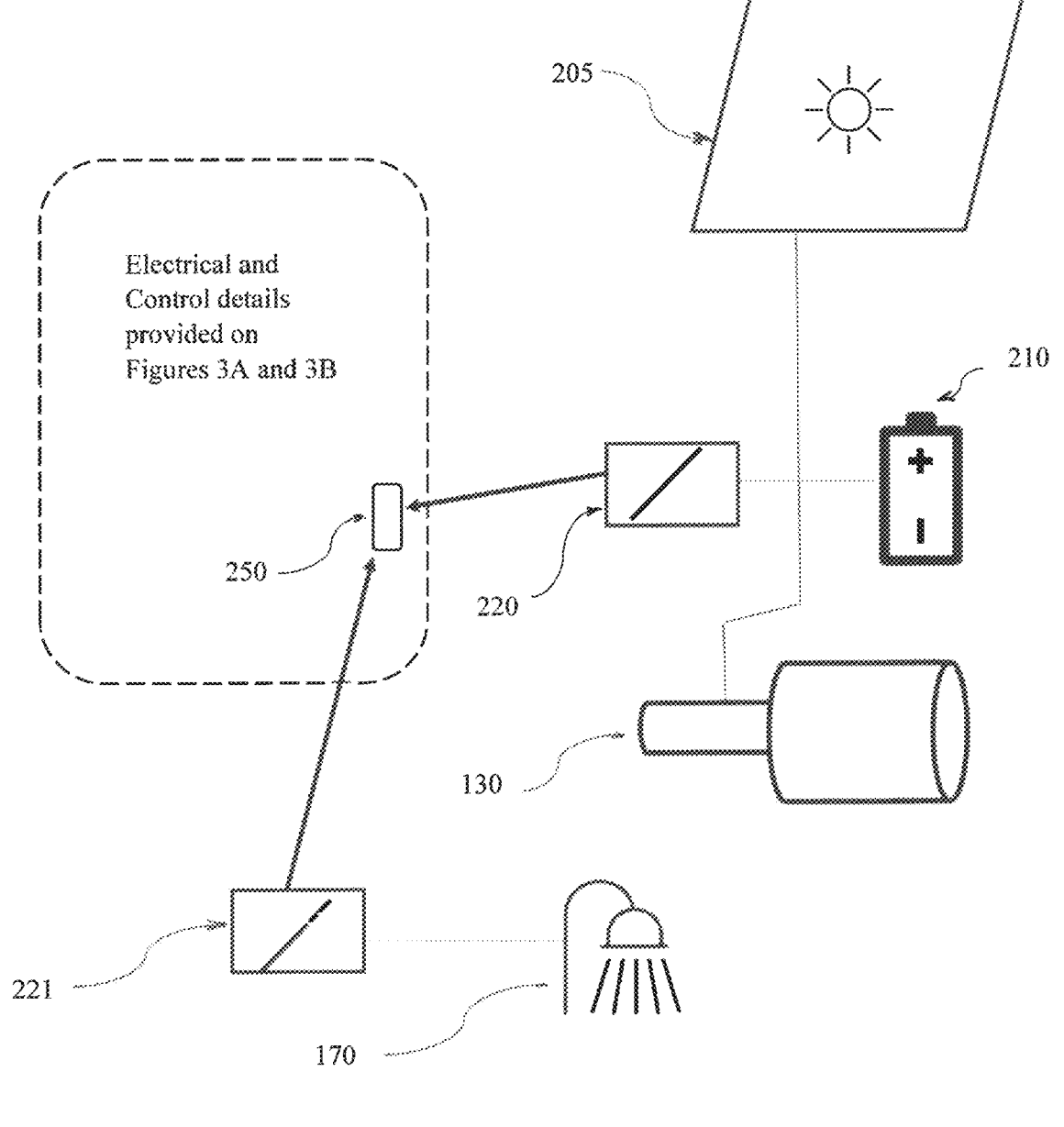
FIG. 2 provides a functional diagram to illustrate the solar power, communication and control systems necessary for operating an arrangement of either a single, or multiple cage hoists.

FIG. 2 functional diagram illustrates the components that enable the automated operation of the aquaculture system embodied by this invention. The solar panel 205, battery 210 will provide power to the winch relay 220 and thus provide electric power to operate each winch 130 for one or more cage hoist 100. In some cases, it will be possible to provide power using the electric utility service, or manual operation to substitute solar battery power. The micro-controller 250, which is programmed to provide the appropriate operation the winch 130 to raise or lower cages 105 (or 110). Cage position can also be controlled with manual control of the relay 220 which includes local control capability. The desiccation cycle pre-wash spray system 170 is controlled by the microcontroller 250 and spray system relay 221 when necessary for additional fouling control and will initiate a brine or vinegar solution spray at the beginning of the desiccation cycle.

Figure 3A:
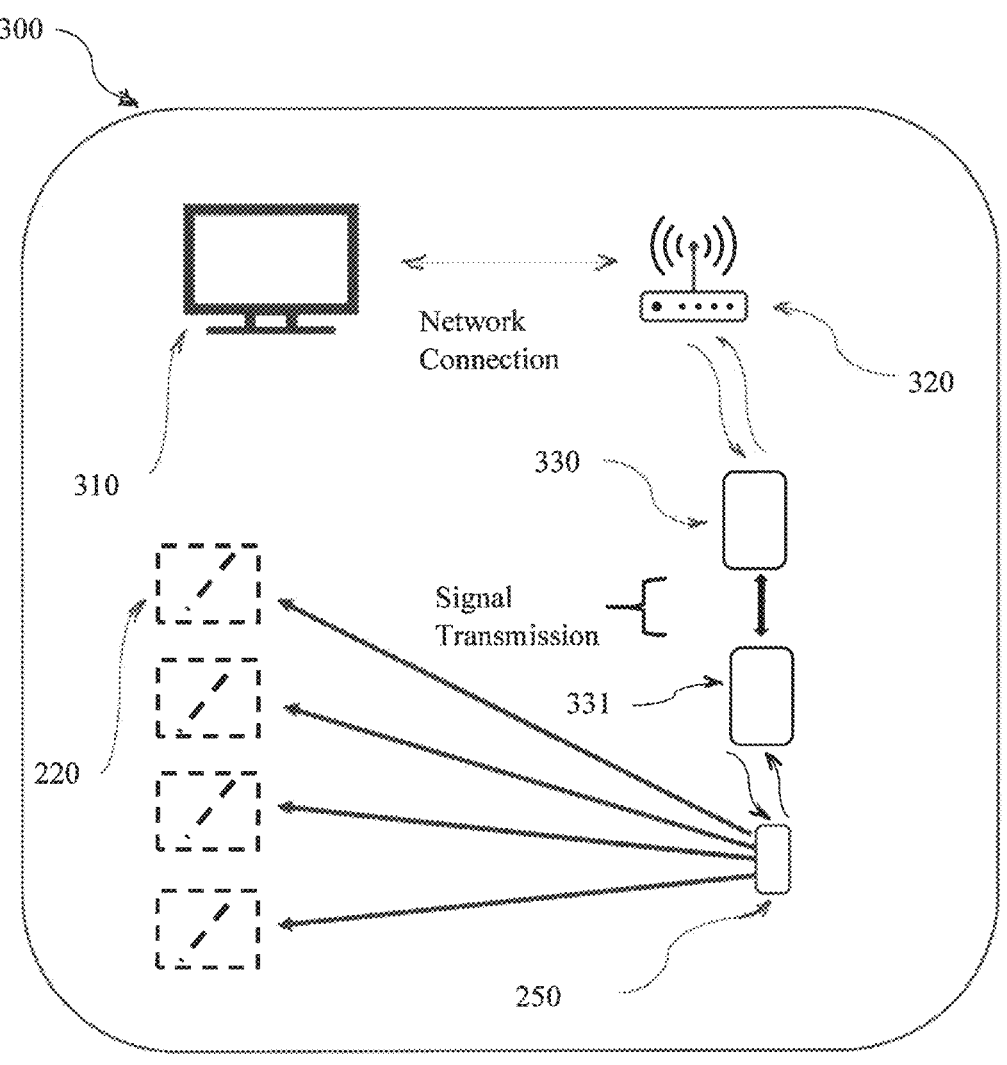
FIG. 3A provides a functional electrical/control diagram to illustrate the computer control network and electrical control system embodied by this invention. This diagram illustrates the use of a virtual network (internet protocol) connection and radio signal transmission and will be used in situations where signal transmission is possible.

FIG. 3A functional diagram shows the schematic arrangement of the control and monitoring system using a virtual network in conjunction with radio data transmission. The virtual network control module 300 includes the network of computers, communication equipment, micro-controllers and local controllers that can operate the aquaculture system for optimum oyster growth. With inputs from the office PC 310, the local PC/modem 320, local micro-computer 330, offshore micro-computer 331, the oyster hoist is operated with minimal labor efforts. The system also records information that will ensure reliable operation of the hoist equipment and will allow evaluation of optimum conditions for shellfish growth.

Figure 3B:
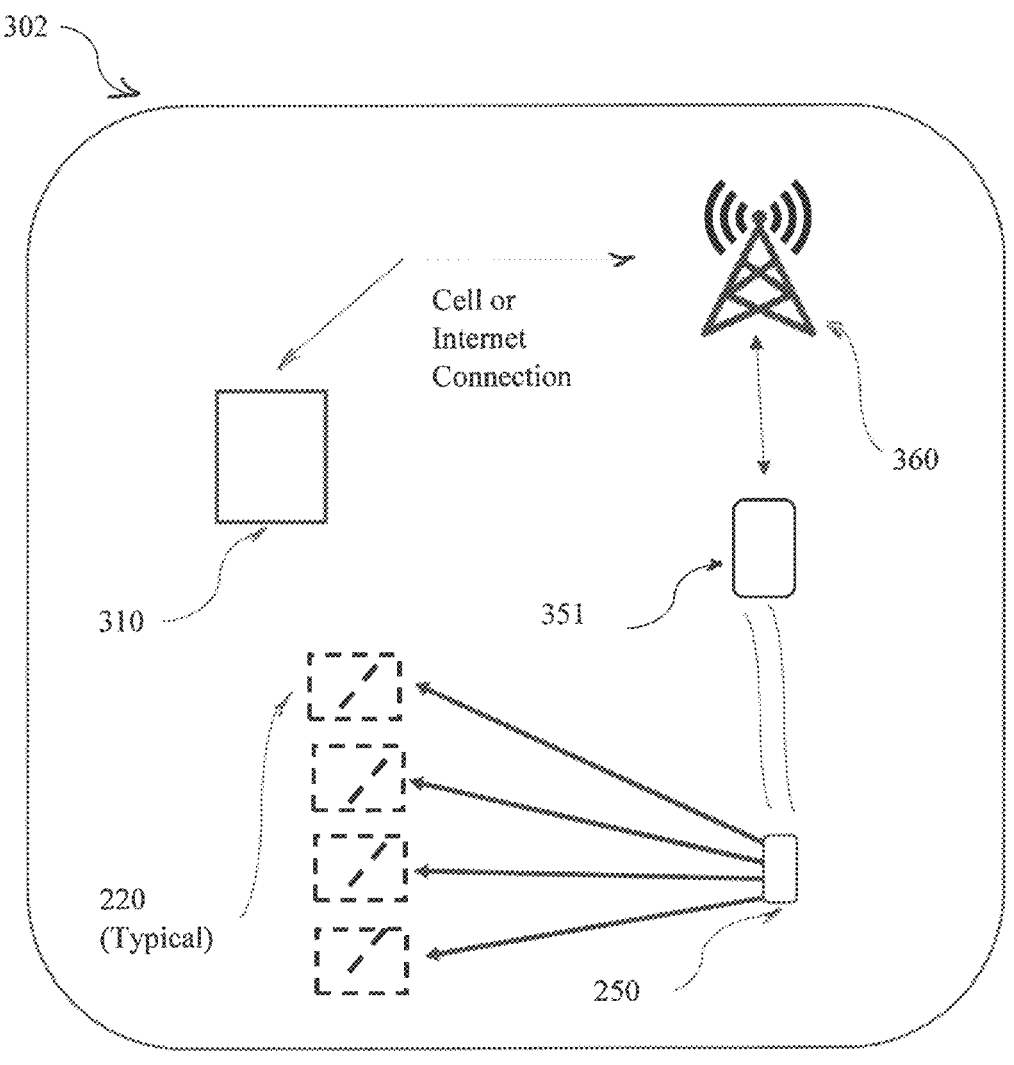
FIG. 3B provides a functional electrical/control diagram to illustrate the cellular transmission network and electrical control system embodied by this invention. This diagram illustrates the use of a cellular network connection. Both configurations may also benefit other local sites which can be reached by radio signal transmission.

FIG. 3B functional diagram shows an alternate schematic arrangement of the control and monitoring system using cellular data transmission 360. The cellular control module 302 includes the network of computers, communication equipment, micro-controllers and local controllers that can operate the aquaculture system for optimum oyster growth. With inputs from the office PC 310, and an offshore micro-computer 351, the cage hoist operates with minimal labor efforts.

Figure 4A:
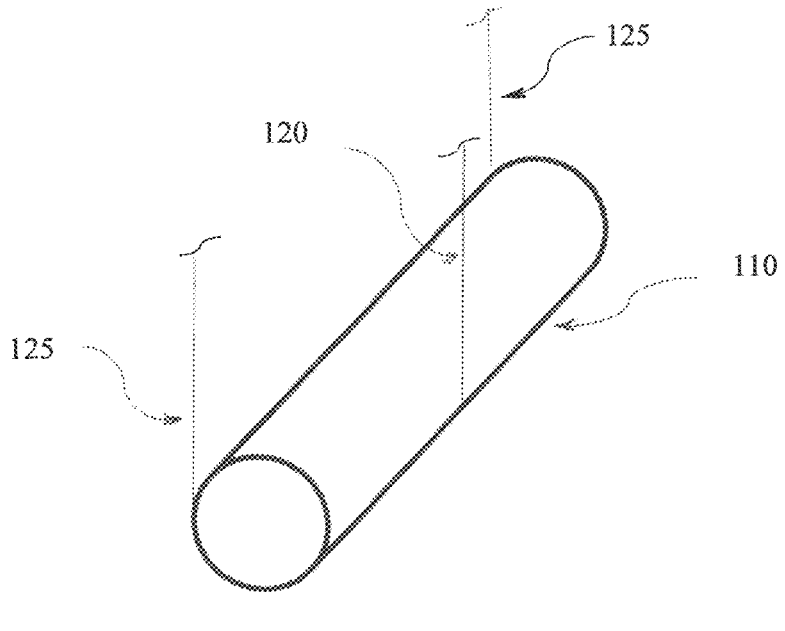
FIG. 4A isometric view illustrates the use of a cylindrical cage to enhance the tumbling operation and to allow desiccation.
Figure 4B:
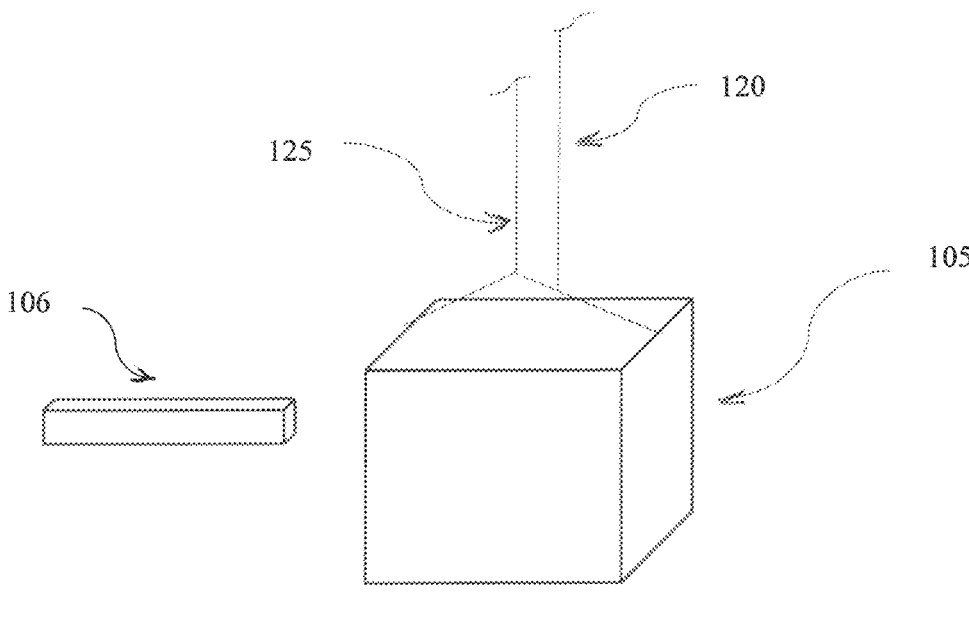
FIG. 4B isometric view provides illustration of arrangements of the cage and mesh bag equipment. This configuration will allow greater capacities of shellfish while allowing both tumbling and desiccation.

FIG. 4A isometric view illustrates a cylindrical cage 110 which can easily facilitate tumbling and cleaning of the shellfish. FIG. 4B isometric view shows the rectangular cage 105, which encases grow out bags 106 and is suited to grow larger volumes of shellfish. The commercially available HDPE mesh grow-out bags 106 will protect oysters during growth phases are contained in corrosion resistant metal cage 105. Both cage 106 and cage 110 can be rigged for a straight lift. To facilitate tumbling, the suspension cable 125 is attached to the cage 105 (or 110) and the cable 120 is then attached to the side of the cage used to tumble the cages and enclosed shellfish.

Figure 5:
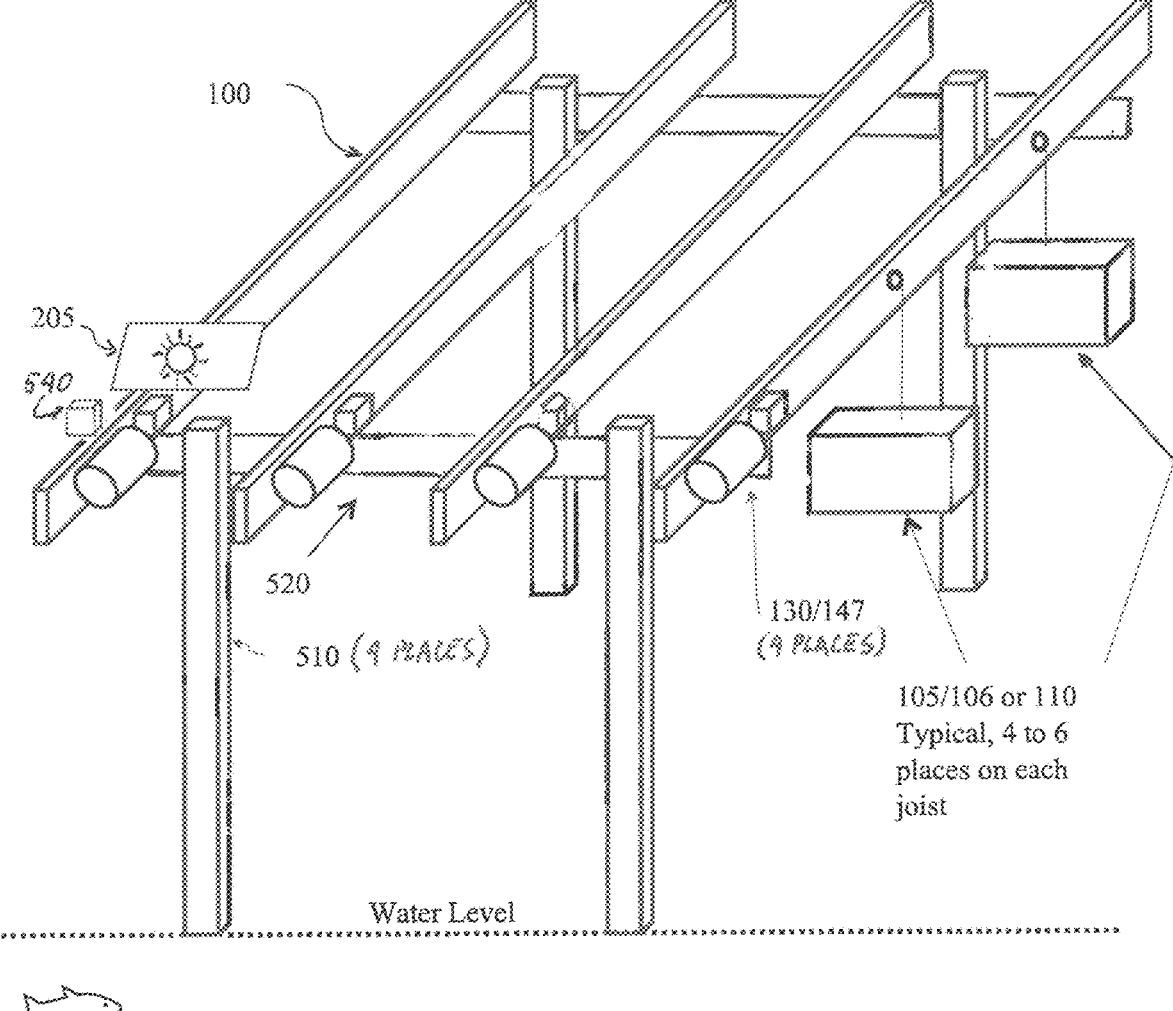
FIG. 5 isometric view provides a configuration of hoist structure and framework supporting 4 cage hoists, a solar panel and cages. Using treated lumber or similar structural material, these joists can range from 2 to 14 feet in length and can support up to 5 cages. The supporting beam can also be up to 14 feet in length and easily support 4 joists. Embodiment of this invention includes the use of a single joist with cages, and where practical, multiple joists and cages in the hoist support framework.

FIG. 5 Hoist support structure 500 configuration illustrates the framework to support multiple cage hoists 100 necessary to provide the appropriate harvest volume. The hoist A support structure consists of stanchions or pilings 510, support beams 520 along with the appropriate foundation support. Electrical components will be enclosed in a housing 540 for protection from weather.

Figures 6A, 6B, 6C:
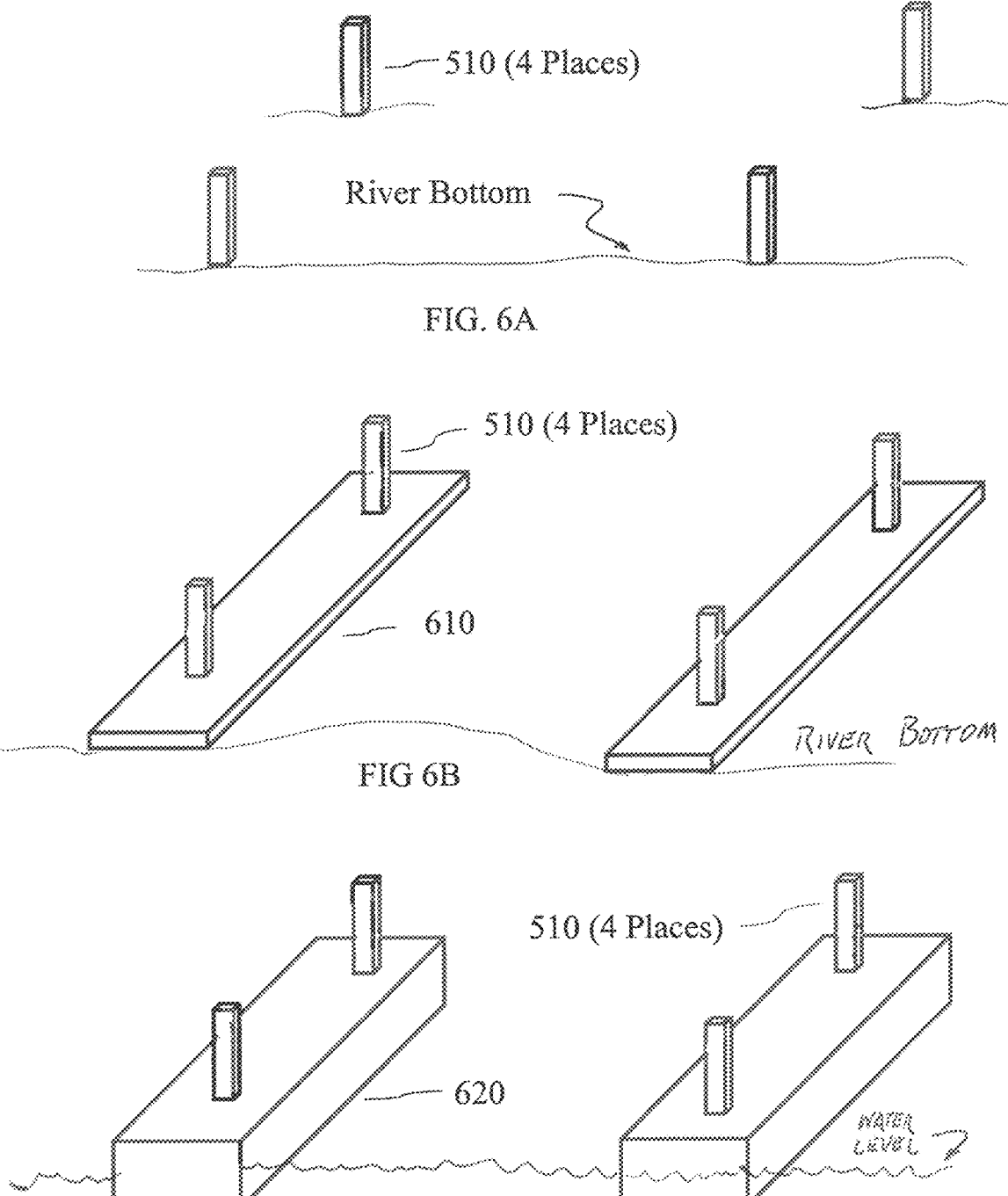
FIG. 6A, FIGS. 6B and 6C provide isometric views of several configurations of foundation support structure for the hoist support framework. Locations which will support driven pilings are shown by FIG. 6A.

FIG. 6 A, FIG. 6B and FIG. 6C illustrate several methods of foundation support for the hoist support structure 500. FIG. 6A illustrates the use of pilings 510 driven in the river bottom. FIG. 6B shows support using horizontal footer planks 610 pinned to the river bottom. FIG. 6C shows support using floating pontoons 620.

The invention claimed is:

1. An aquaculture farming system comprising:
   one or more shellfish cages;
   a hoist support structure comprising a first pair of spaced stanchions or pilings, a first support beam connecting the first pair of spaced stanchions or pilings, a second pair of spaced stanchions or pilings, a second support beam connecting the second pair of spaced stanchions or pilings, the first and second support beam spaced a distance apart; one or more joists perpendicular and spanning the spaced distance between the first and second support beam; wherein the hoist support structure is configured to support one or more joists with up to five shellfish cages spaced along the length of each joist;
   a foundation support system to be submerged in water for the first and second pair of spaced stanchions or pilings;
   an intelligent and robotic lifting system comprising a single winch and an alignment/load sensor mounted on an end of each of the one or more joists; each of the one or more shellfish cages is suspended by a single cable routed through a pulley; each of the one or more shellfish cages has its own single cable and its own pulley; each single cable is collectively spooled into the single winch on its respective joist; wherein the single winch simultaneously and in unison lifts and lowers all shellfish cages on its respective joist; wherein the one or more shellfish cages are lifted and positioned above a waterline for a desiccation cycle, maintenance, or for harvesting; wherein the one or more shellfish cages are lowered and submerged in water for shellfish growth;

a spray system attached to each of the one or more joists comprising a salt brine or a vinegar solution spray and controlled by a microcontroller and a spray system relay; wherein a periodic shellfish desiccation cycle is initiated; and a control system comprising a communication system; a remote data system; and a data management and storage system, wherein the control system measures one or more shellfish cage positions, weather information, shellfish growth rates, and biofouling to timely and properly position the one or more shellfish cages.

2. An aquaculture farming system according to claim 1, a primary power source of solar panels with battery storage and a backup power source of electric utility or manual power provided to each winch to provide a motive force to position the one or more shellfish cages.

3. An aquaculture farming system according to claim 1, wherein the one or more shellfish cages are either cuboid or cylindrical to enhance a tumbling operation and desiccation.

4. An aquaculture farming system according to claim 1, wherein said control system provides necessary operation sequences for each winch initiated by an automated microcontroller, by remote signaling, or by a local manual operation as necessary with consideration for optimal growth conditions.

5. An aquaculture farming system according to claim 1, wherein said data management and storage system allows a local and remote data review of operations for control of desiccation cycles and growth periods that optimizes shellfish growth.

6. An aquaculture farming system according to claim 1, wherein said remote data system measures and relays local environmental conditions for use in determining optimum operating parameters for each single winch for the aquaculture farming system; for data processing; for monitoring; and for allowing operator feedback to optimize shellfish growth.

7. An aquaculture farming system according to claim 1, wherein said communication system provides a relay of files and information needed for data processing and monitoring in order to allow for farm manager evaluation and adjustment to operations for improvements.

8. An aquaculture farming system according to claim 1, wherein said foundation support system includes one of three types of foundation to include subsurface pilings, used when local ordinance permits; horizontal footer planks, used for generally flat river bottom conditions; and a stationary, unpowered, buoyant floating structure to suit deep water river conditions.

* * * * *